United States Patent [19]

Rothgordt

[11] 3,899,035

[45] Aug. 12, 1975

[54] FACSIMILE TRANSMITTING RECEIVING SYSTEM WITH FIBRES HAVING A CONDUCTIVE COATING

[75] Inventor: Ulf Rothgordt, Bargkoppel, Germany

[73] Assignee: U.S. Philips Corporation, New York, N.Y.

[22] Filed: Jan. 7, 1974

[21] Appl. No.: 431,440

[30] Foreign Application Priority Data

Jan. 12, 1973 Germany............................ 2301335

[52] U.S. Cl................................................ 178/6.6 A

[51] Int. Cl................................................ H04n 1/24

[58] Field of Search......... 178/6.6 A, 6.6 R, DIG. 2; 350/96; 346/74

[56] References Cited

UNITED STATES PATENTS

| | | | |
|---|---|---|---|
| 2,832,820 | 4/1958 | Blackstone | 178/6.6 A |
| 3,007,049 | 10/1961 | McNaney | 178/6.6 A |
| 3,167,612 | 1/1965 | Strickholm | 178/DIG. 2 |
| 3,318,996 | 5/1967 | Garfield et al. | 178/6.6 A |
| 3,470,320 | 9/1969 | Pike et al. | 178/DIG. 2 |
| 3,663,748 | 5/1972 | Boon | 178/6.6 A |
| 3,789,259 | 1/1974 | Allen | 178/6.6 A |

*Primary Examiner*—Raymond F. Cardillo, Jr.
*Attorney, Agent, or Firm*—Frank R. Trifari; Ronald L. Drumheller

[57] ABSTRACT

Facsimile transmitting and receiving system, comprising a large number of aligned styli which each comprise a glass fibre surrounded by an electrically conducting coating and serve to produce electrostatic charge images when the system is used as a receiver and to perform optical scanning when it is used as a transmitter.

7 Claims, 4 Drawing Figures

FACSIMILE TRANSMITTING RECEIVING SYSTEM WITH FIBRES HAVING A CONDUCTIVE COATING

Figure 1:
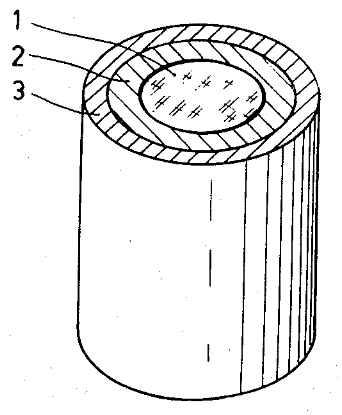

The invention relates to a facsimile transmitting and receiving system comprising means for displaying information on a record sheet and means for scanning a subject copy.

Facsimile apparatus are known in which a record carrier or subject copy to be scanned can be mounted on a drum. A recording and scanning member, which for example comprises a stylus and a photodiode and is adapted to be moved parallel to the drum axis, is caused to helically scan the entire recording or subject copy area whilst the drum revolves. Disadvantages of these apparatus are first the laborious mounting of the subject copy or record carrier on the drum and secondly the limitation of the speed by the mechanical rotation of the drum. Thirdly a drum permits only purely serial scanning of the picture elements. Serial scanning is unsuitable for simple information reduction used to remove part of the redundant information both in optical scanning of the subject copy and in recording the received information in a manner corresponding to the subject copy. On the other hand, facsimile systems are known which do not suffer from the latter disadvantages. However, these systems require separate scanning apparatus and recording apparatus.

It is an object of the present invention to avoid the disadvantages of the known methods and to provide considerable simplification of the scanning and recording apparatus. In the system according to the invention this is achieved in that the recording means are of the electrostatic type, comprising a large number of aligned styli adapted to produce a charge image, each stylus comprising an electrically conductive coating surrounding a glass fibre, whilst the scanning means are of the optical type and are constituted by the said glass fibres which act as optical conductors and are capable of transmitting the luminance values of the individual elements of the subject copy to opto-electronic converters.

Because the same apparatus can be used for both scanning and recording, manufacture is considerably simplified. Furthermore in the novel system only few moving components are required, which reduces wear and necessary maintenance. The combination of recording and scanning apparatus permits double or common use of many components, both mechanical and electronic, for example during scanning the light sources may be supplied by the same high-voltage amplifiers which supply the electrodes during recording.

Recording is effected by a known electrostatic method. This substantially comprises two or three stages. First suitable electrode arrays, for example styli arranged in a row, are selectively driven by voltage pulses of several hundreds of volts so as to produce a charge image on a record carrier, usually a dielectrically coated paper, which is moved close past the pins. A lower threshold voltage below which no charging is effected enables the use of different types of coincidence driving of the styli, so that for apparatus which have an electrode comb across the entire width of the paper a considerable saving in circuit elements for driving the styli can be obtained. The next stage of the recording operation consts in developing the initially invisible charge image. This is performed by processes in which either a fine dry powder is applied to the surface charged according to the image in correct concentration by admixture of a coarse-grained carrier material or pigments dispersed in dielectric liquids are used to render the charge image visible. In both cases the processes may be performed so that the pigment particles adhere only to the charged areas of the record carrier. Intimate permanent adherence is achieved, in particular in the case of the dry pigment powders, by fixing, for example by causing resinous pigment particles to penetrate into the record carrier surface.

In a preferred embodiment of the printing and scanning apparatus the optically conducting styli are combined in groups, corresponding styli of the different groups being united together. The united styli can jointly be energized by an electric pulse and can transmit the light reflected from the subject copy to be scanned to a common optoelectronic transducer. Individually switchable counter electrodes known in electrostatic recording technology which are disposed at the rear of the record carrier enable a selection to be made which stylus or styli of the jointly energised styli is to perform the recording operation, i.e. the production of the charge image. During scanning of a subject copy the active optically conducting fibres are selected by a second row of optically conducting fibres which need not have an electrically conducting coating. This second row is arranged directly beside the first row of optical conductors and is also divided in groups. Each group is associated with a source of light. The light sources of the various groups are switched on sequentially and hence enable a light value received from the optoelectronic transducers to be assigned to a given location on the subject copy.

Figure 2:
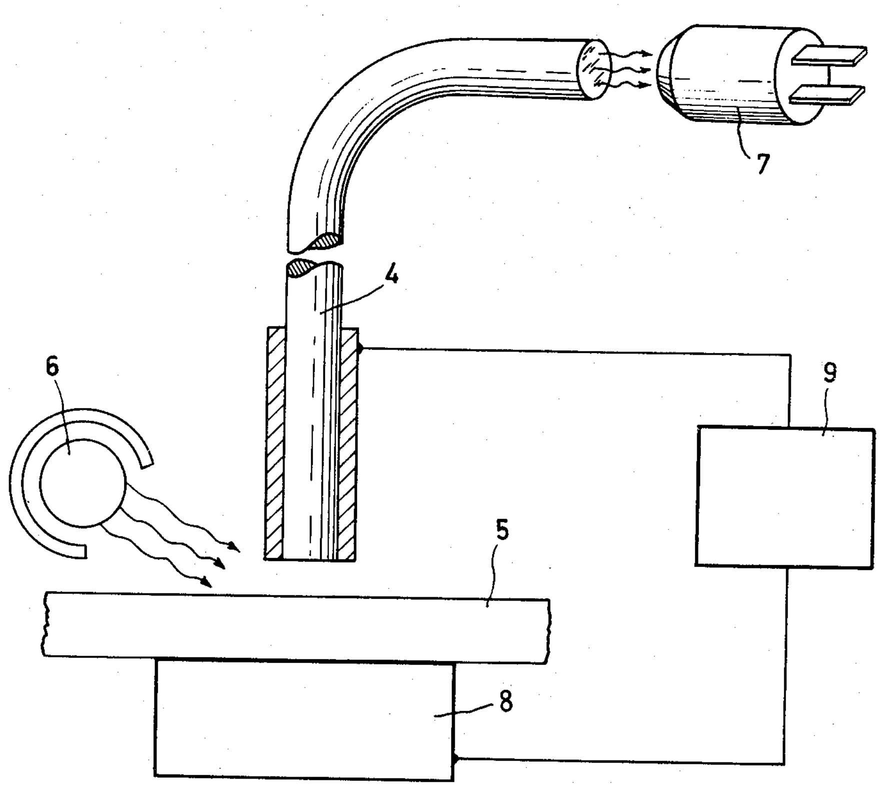
Figure 3:
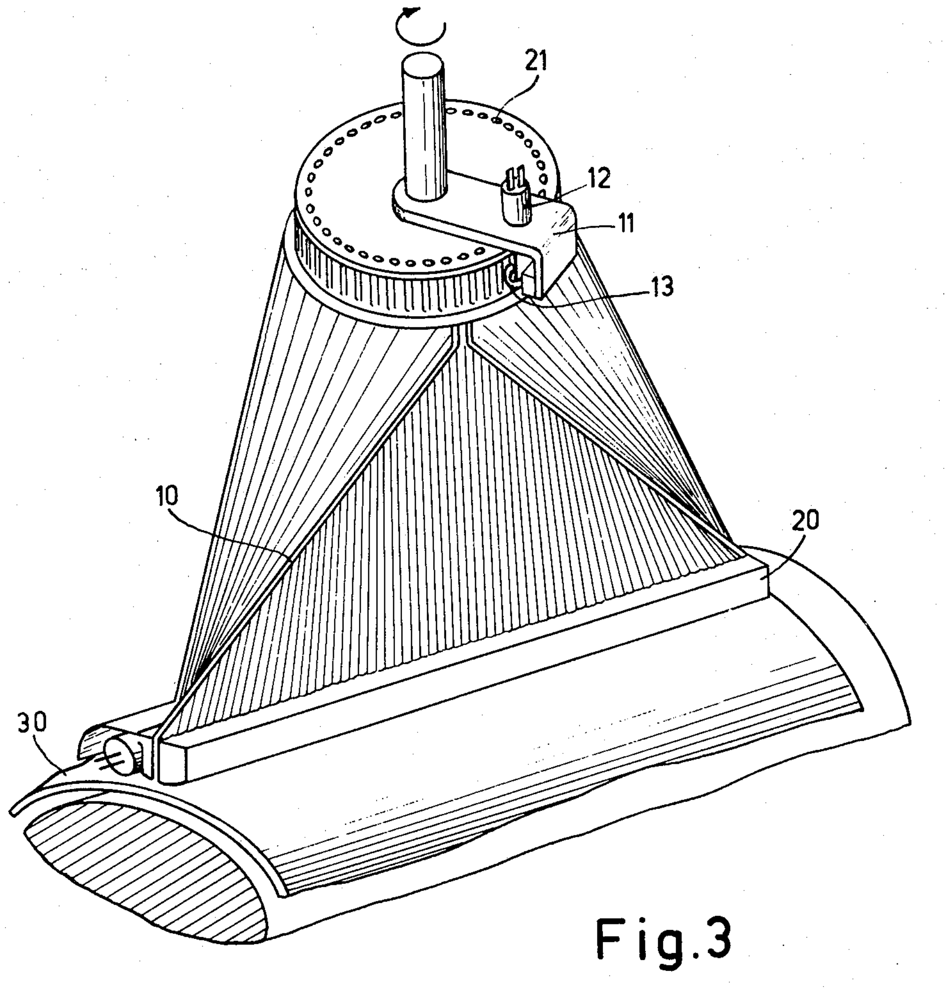
Figure 4:
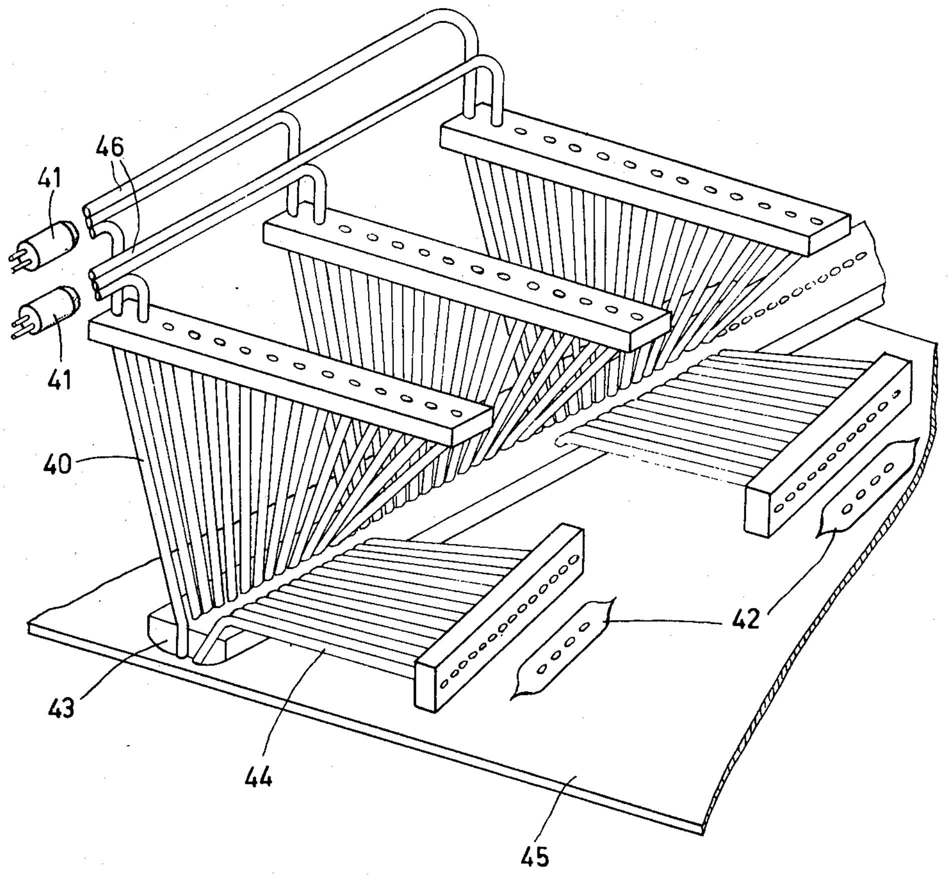

Embodiments of the invention will now be described, by way of example, with reference to the accompanying diagrammatic drawings, in which:

FIG. 1 shows the structure of a glass fibre surrounded by a conductive coating for use in a system according to the invention, FIG. 2 shows a separate recording and scanning component for use in the system according to the invention, FIG. 3 shows a first embodiment of a recording and scanning head of a system according to the invention, and FIG. 4 shows a second embodiment of such a recording and scanning head.

Referring now to FIG. 1, there is shown an optically conducting fibre surrounded by an electrically conducting coating 3 as a basic component of a system according to the invention. The core 1 consists of a transparent material having a refractive index greater than that of a likewise transparent inner sheath 2 which encases the core. Under certain conditions the inner sheath 2 and the coating 3 may be made of the same material. Owing to the lower refractive index of the inner sheath 2 light transmitted through the core is totally reflected at the interface of the core and the inner sheath so that the light is propagated in the core substantially without attenuation. The electrically conductive coating serves as a conductor for the current pulses required for the production of a charge image.

FIG. 2 shows diagrammatically the combined operation of an optically conducting fibre stylus 4 of the structure shown in FIG. 1. In the scanning mode a record carrier 5, which is the subject copy, is illuminated by a source of light 6, and part of the light scattered by the copy 5 in accordance with the luminance of the copy element concerned enters the optically conducting fibre and finally is detected by a photosensitive component, for example a photodiode 7. In the receiving mode, i.e. during recording, a blank record carrier 5 is inserted into the gap between the fibre 4 and a support plate or counter-electrode 8. In accordance with the signal received an electric pulse generator 9 applies a pulse of adequate voltage to the conductive coating of the fibre 4 so that an electric discharge is produced between the coating and the surface of the record carrier. As a result a circular area is charged which owing to the spreading of the discharge covers not only the inner portion of the annular electrode but also a small area beyond its outer circumference. The end face of the fibre 4 may be coated with a transparent metal film. A complete scanning and recording system advantageously comprises a large number of optically conducting fibre styli arranged side by side. Scanning and driving a large number of such fibres may be performed in various manners. Two embodiments will be described by way of example.

In FIG. 3 aligned fibres 10 of a printing and reading head are brought together to form a circle 21 which is scanned by a rotating arm 11. The arm 11 carries a photodiode 12, which during each revolution sequentially picks up the luminance values of all the elements of a line of the subject copy, and a commutator 13, which via the electrically conductive coating of each individual fibre is energised by a pulse produced by a pulse generator (not shown). After or during a revolution the subject copy 30 is shifted a small distance in a direction at right angles to the said line by means (not shown). Thus each successive line is optically scanned. The signal derived from the scans by the photo-diode 12 represents the black-and-white information of the subject copy and may be applied to a facsimile receiver as a facsimile signal.

In order to use such an apparatus as a facsimile receiver a blank record carrier 30 is inserted which is moved in the same manner as described hereinbefore. A charge image is produced by means of a pulse generator (not shown) which in accordance with the signal received applies pulses to the electrically conductive coatings of selected fibres via the commutator 13. The current from the pulse generator may be supplied to the commutator via a slipring mounted on the shaft of the rotating arm and an associated brush (not shown).

The problem of synchronism of the rotating arms of transmitter and receiver will not be discussed herein; to produce a facsimile record of the subject copy naturally requires the use of synchronising means, but these may be assumed to be known and do not form part of the invention.

A reduction of the transmission time by reduction of the redundancy of the signal produced by serial scanning of a subject copy which cannot be obtained by means of the apparatus of FIG. 3 is obtainable by means of the embodiment shown in FIG. 4. FIG. 4 shows only the basic components of the optically conducting fibre styli 40 in their combination and serves only as an illustration.

A scanning and recording head 43 disposed directly over the record carrier 45 comprises two rows of closely adjacent optically conducting fibre ends. One of these rows comprises only optically conducting fibres 40 provided with the electrically conductive coatings according to the invention. Hence these fibres 40 also serve to produce the charge image when the apparatus acts as a receiver. The second row of optically conducting fibres 44 does not require such coatings. It serves only for intermittently illuminating the subject copy during scanning when the apparatus acts as a transmitter. The intermittent illumination of the subject copy enables coincidence operation for scanning also and hence requires a comparatively low number of optoelectronic transducers 41. The electrically conductively coated fibres 40 are divided in groups each of $k$ fibres. When the total amount of fibres across the entire scanning width is $k{\cdot}m$ there are $m$ groups. Similarly the optical supply fibres 44 are divided in $m$ groups which each are assigned to a light source 42. All the optically conducting fibres number $\mu k + 1$, where $0 \leq \mu \leq m - 1$, are jointly connected to a first optoelectronic transducer 41, for example the fibres numbered 1, $(k + 1)$, $(2k + 1)$, etc. are connected to the first transducer. By means of this apparatus the facsimile signal is obtainable in the following manner. In a first stage the first of the $m$ light sources 42 is lit. As a result the area under the first $k$ optically conducting fibres 40 is illuminated. Each of the transducers 41 receives a light signal which corresponds to the luminance of one of the $k$ picture elements and is applied as an electric signal to an analog or digital shift register. Sequential reading of this shift register provides the first $k$ values of the facsimile signal. After the shift register has been read the second of the $m$ light sources (not shown in FIG. 4) can be lit, which in a similar manner provides the second $k$ values of the facsimile signal. The $m^{th}$ light source finally terminates the scanning of a line, after $k{\cdot}m$ values have been obtained from it. By continuous or intermittent movement of the subject copy through the distance of an element the following line can then be scanned in the same manner.

The use of the apparatus described as a facsimile receiver requires a small addition. In the technology of electrostatic recording the use of individually switchable counter-electrodes is known (see for example German prepublished Patent Application 1,946,815). Hence beneath the record carrier 45 counter-electrodes arranged in the same manner as the groups of optical supply fibres 44 must be provided opposite the scanning head 43. An untreated facsimile signal, i.e. a facsimile signal from which no redundant information has been removed, then is recorded so that in the first stage the first counter-electrode is energized and high-voltage pulses derived from the facsimile signal are sequentially supplied to the various optically conducting fibres which are brought together at 46 and now act as printing electrodes. Owing to the aforedescribed electric charging process which starts only beyond a given threshold voltage the said pulses are effective only in the regions of the energized counter-electrodes. Sequential energisation of all the counter-electrodes enables the entire line to be recorded.

Other forms and groups of coincidence arrangements are possible using the optically conducting fibre printing electrodes according to the invention. Some of these forms are described in the aforementioned German Patent Application 1,946,815.

If at the transmitter end of the facsimile system a reduction of information has been effected to achieve an increased transmission rate, in order to recover an image corresponding to the subject copy decoding must be effected in the receiver. However, such decoding may be greatly simplified if recording is not to be effected by purely sequential driving of all the printing electrodes. The latter would be the case, for example, with mechanical recording systems.

In contradistinction thereto, the aforedescribed method when using individual driving of the printing electrodes enables completely selective recording at any printing position. For example, if only a few elements of a line are to be recorded, it is sufficient to drive only a few printing electrodes and the corresponding counterelectrodes, permitting recording of the next line to begin after a very short time.

What is claimed is:

1. In a facsimile transmitting and receiving system of the type having electrostatic printing means for recording facsimile signals on a record sheet and optical scanning means for reading a subject copy, the improvement wherein the same styli used during electrostatic printing are also used during optical reading, each of said styli comprising: an optically conducting glass fibre for optically transmitting luminance values of elemental areas of a subject copy adjacent one end thereof to an optoelectronic transducer; and an electrically conductive coating surrounding said fibre at least at said one end thereof for conducting electrical pulses to said one end in order to electrostatically charge elemental areas of a record sheet adjacent thereto.

2. The improvement defined in claim 1 wherein said optically conducting glass fibre is surrounded by a sheath having an index of refraction lower than the index of refraction of said glass fibre and said electrically conductive coating is on the outside of said sheath.

3. The improvement defined in claim 1 wherein said electrically conductive coating is of metal.

4. The improvement defined in claim 1 and further comprising a transparent metal film covering the end face of said one end of said fibre, said metal film being in electrical contact with said coating.

5. The improvement defined in claim 1 wherein said styli are aligned in a row at said one end thereof and in a circle at the other end thereof, a rotating arm carrying an optoelectronic transducer and a commutator for distributing electrical pulses being disposed opposite said other end for successive connection with said styli.

6. The improvement defined in claim 1 wherein said styli are aligned in a row at said one end thereof and are combined into groups at the other ends thereof, each group thereof being associated with a separate optoelectronic transducer.

7. The improvement defined in claim 6 wherein optically conducting glass fibres associated with switchable light sources selectively illuminate the elemental area of the subject copy adjacent one stylus of a group at a time.

* * * * *